United States Patent
Telakowski

(10) Patent No.: US 8,910,463 B2
(45) Date of Patent: Dec. 16, 2014

(54) TURBINE STARTER LUBRICANT COOLING

(75) Inventor: Robert Telakowski, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1270 days.

(21) Appl. No.: 12/709,961

(22) Filed: Feb. 22, 2010

(65) Prior Publication Data

US 2011/0203249 A1    Aug. 25, 2011

(51) Int. Cl.
| | |
|---|---|
| F02C 7/12 | (2006.01) |
| B64F 1/34 | (2006.01) |
| F02C 7/14 | (2006.01) |
| F02C 7/277 | (2006.01) |
| F01D 25/18 | (2006.01) |
| F02C 7/06 | (2006.01) |

(52) U.S. Cl.
CPC ............... *F02C 7/14* (2013.01); *Y02T 50/671* (2013.01); *F02C 7/277* (2013.01); *F05D 2260/205* (2013.01); *F01D 25/18* (2013.01); *Y02T 50/675* (2013.01)
USPC .......... 60/39.83; 60/39.08; 60/786; 244/53 A; 184/6.11

(58) Field of Classification Search
CPC ............ F01D 25/18; F02C 7/14; F02C 7/277; F05D 2260/205
USPC ........ 60/39.08, 39.83, 786; 184/6.11, 6.3, 65; 310/54; 244/53 A
See application file for complete search history.

(56) References Cited

U.S. PATENT DOCUMENTS

| | | | | |
|---|---|---|---|---|
| 2,566,049 | A | * | 8/1951 | Williams ................... 60/39.091 |
| 3,080,716 | A | * | 3/1963 | Cummings et al. ............. 60/736 |
| 3,451,214 | A | * | 6/1969 | Bradley .......................... 60/788 |
| 3,722,212 | A | * | 3/1973 | Stein ............................. 60/39.08 |
| 3,779,007 | A | * | 12/1973 | Lavash ........................ 60/39.281 |
| 4,020,632 | A | * | 5/1977 | Coffinberry et al. ............ 60/773 |
| 4,041,697 | A | * | 8/1977 | Coffinberry et al. ........ 60/39.281 |
| 4,391,349 | A | * | 7/1983 | Carroll et al. ................ 184/6.26 |
| 4,525,995 | A | * | 7/1985 | Clark ........................... 60/39.08 |
| 4,696,156 | A | * | 9/1987 | Burr et al. .................... 60/39.08 |
| 4,776,536 | A | * | 10/1988 | Hudson et al. ............ 244/135 R |
| 4,779,413 | A | * | 10/1988 | Mouton ....................... 60/39.08 |
| 5,072,145 | A | * | 12/1991 | Davis et al. ..................... 310/54 |

(Continued)

FOREIGN PATENT DOCUMENTS

GB        2144804 A   *  3/1985
GB              f02 c   *  3/1985  ............... F02C 7/06

*Primary Examiner* — Ehud Gartenberg
*Assistant Examiner* — Jason H Duger
(74) *Attorney, Agent, or Firm* — Cantor Colburn LLP

(57) ABSTRACT

A cooling system for turbine starter lubricant includes one or more outflow transfer passages (54) extending from the turbine starter (10) to a secondary component (40). At least one heat exchange passage (56) affixed at a first end to an end of an outflow transfer passage (54) of the one or more outflow transfer passages (54), is located in the secondary component (40) having a lower interior temperature than the turbine starter (10). One or more return transfer passages (60) are affixed to a second end of the at least one heat exchange passage (56) and extend from the secondary component (40) to the turbine starter (10). Flowing a volume of starter lubricant (42) through the one or more outflow transfer passages (54), the at least one heat exchange passage (56), and the one or more return transfer passages (60) removes thermal energy from the volume of starter lubricant (42) and returns the volume of starter lubricant (42) to the turbine starter (10).

11 Claims, 2 Drawing Sheets

(56) References Cited

U.S. PATENT DOCUMENTS

| | | | |
|---|---|---|---|
| 5,253,470 A * | 10/1993 | Newton | 60/39.08 |
| 5,359,247 A * | 10/1994 | Baldwin et al. | 310/54 |
| 5,911,678 A | 6/1999 | White | |
| 6,438,962 B1 | 8/2002 | Blain et al. | |
| 6,629,816 B2 * | 10/2003 | Giesler et al. | 415/111 |
| 6,681,579 B2 | 1/2004 | Lane et al. | |
| 6,991,425 B2 | 1/2006 | Kruegel et al. | |
| 7,014,419 B2 | 3/2006 | Farnsworth et al. | |
| 7,093,447 B2 | 8/2006 | Thompson et al. | |
| 7,104,072 B2 | 9/2006 | Thompson | |
| 7,131,275 B2 | 11/2006 | Gustafson | |
| 7,186,081 B2 | 3/2007 | Giesler et al. | |
| 7,367,427 B2 * | 5/2008 | Gaines et al. | 184/6.11 |
| 7,373,771 B2 * | 5/2008 | Brouillet | 60/39.08 |
| 7,434,765 B2 * | 10/2008 | Zielinski et al. | 244/57 |
| 7,566,356 B2 * | 7/2009 | Latulipe et al. | 55/400 |
| 7,694,780 B2 * | 4/2010 | Beels van Heemstede et al. | 184/6.12 |
| 7,878,302 B2 * | 2/2011 | Smith | 184/6.11 |
| 7,971,423 B2 * | 7/2011 | Avila et al. | 60/39.08 |
| 8,312,969 B2 * | 11/2012 | Hoang | 184/6.11 |
| 8,381,509 B2 * | 2/2013 | Bulin et al. | 60/204 |
| 8,511,055 B2 * | 8/2013 | DiBenedetto et al. | 60/39.08 |
| 8,511,967 B2 * | 8/2013 | Suciu et al. | 415/108 |
| 8,522,521 B2 * | 9/2013 | Dyer | 60/39.08 |
| 2003/0145602 A1 * | 8/2003 | Lane et al. | 60/787 |
| 2006/0005547 A1 * | 1/2006 | Brouillet | 60/802 |
| 2006/0207834 A1 * | 9/2006 | Giesler et al. | 184/65 |
| 2009/0007568 A1 * | 1/2009 | Eccles et al. | 60/787 |
| 2011/0203249 A1 * | 8/2011 | Telakowski | 60/39.08 |
| 2012/0067167 A1 * | 3/2012 | Norem et al. | 74/7 C |

* cited by examiner

TURBINE STARTER LUBRICANT COOLING

BACKGROUND OF THE INVENTION

The subject matter disclosed herein generally relates to pneumatic turbine starters. More specifically, the subject disclosure relates to cooling of pneumatic turbine starter lubricant.

Aircraft engines, for example, gas turbines, are typically equipped with an air-driven or gas driven turbine starter mounted on the engine accessory gearbox. The functional purpose is to accelerate the engine up to a desired speed prior to ignition of the engine combustor. The turbine starter is typically driven by pressurized air provided by an air source such as an auxiliary power unit, another operating engine, or an external air cart connected to the turbine starter. Pressurized air or gas is fed into the turbine starter drives rotation of starter turbine blades causing rotation of a starter shaft. The starter shaft transmits this rotation to the drive shaft of the accessory gearbox. Rotation of the gearbox shaft drives rotation of a high pressure rotor of the engine which induces airflow into the engine and causes rotation of the engine low pressure rotor assembly. When the engine rotation reaches a desired speed, combustion is initiated.

Typical turbine starters include a lubrication system which delivers lubricant such as oil to the rotating elements of the turbine starter via, for example, a splash system or an oil pump internal to the turbine starter. The service life of the lubricant, and the starter itself, is often limited by the hot/hostile environment of the installation and such installation does not provide cooling of the lubricant that would extend its life, and consequently the life of the starter. Active cooling systems including oil coolers, pumps, filters, etc. are disadvantageous due to weight, packaging size, cost and reliability problems associated with such systems. Other lubrication systems occasionally used in starters mingle lubricant of the engine gearbox with that of the starter to cool the starter lubricant. This approach has disadvantages, however, in that it exposes the gearbox and engine cooling systems to contamination from the starter in the event of starter damage and/or failure. The art would well receive an alternative cooling system for turbine starter lubricant

BRIEF DESCRIPTION OF THE INVENTION

According to one aspect of the invention, a cooling system for turbine starter lubricant includes one or more outflow transfer passages extending from the turbine starter to a secondary component. At least one heat exchange passage is located in the secondary component affixed at a first end to an end of an outflow transfer passage of the one or more outflow transfer passages, the secondary component having a lower interior temperature than the turbine starter. One or more return transfer passages are affixed to a second end of the at least one heat exchange passage and extend from the secondary component to the turbine starter. Flowing a volume of starter lubricant through the one or more outflow transfer passages, the at least one heat exchange passage, and the one or more return transfer passages removes thermal energy from the volume of starter lubricant and returns the volume of starter lubricant to the turbine starter.

According to another aspect of the invention, a method of cooling lubricant of a turbine starter includes flowing a volume of starter lubricant from the turbine starter to a secondary component via one or more outlet transfer passages. The starter lubricant is flowed through at least one heat exchange passage disposed in the secondary component which has a lower interior temperature than the turbine starter, thereby removing thermal energy from the starter lubricant. The volume of starter lubricant is returned to the turbine starter via one or more return transfer passages.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
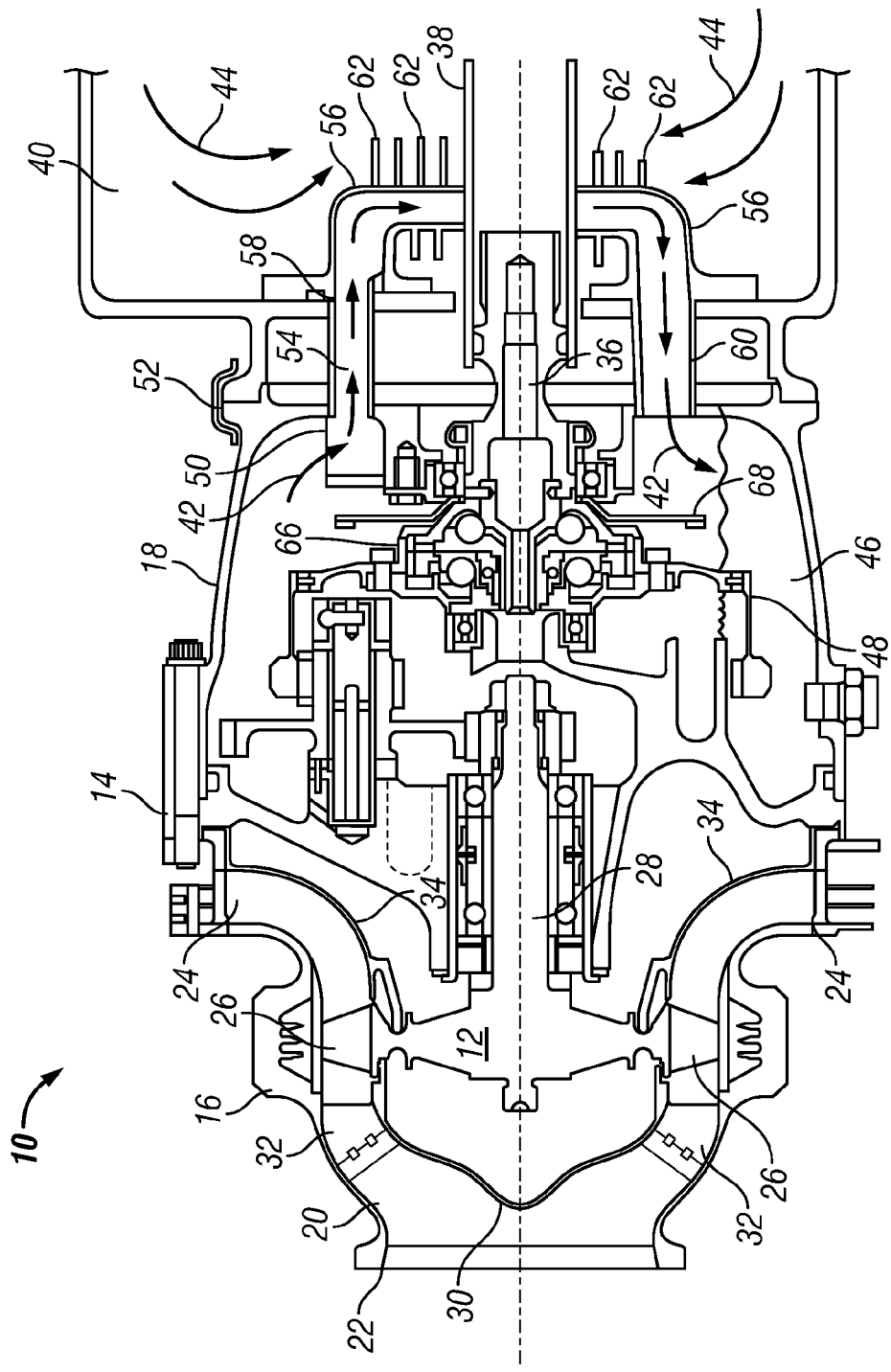
FIG. 1 is a cross-sectional view of an embodiment of a cooling system for a turbine starter.

Shown in FIG. 1 is an embodiment of a turbine starter 10. The turbine starter 10 includes a turbine wheel 12 that is driven by a compressed gas, from a source such as an auxiliary power unit (APU), another operating engine, or an external air cart. The turbine starter 10 has a gear housing 14 disposed between and mounted to an inlet housing 16 and a transmission housing 18. The inlet housing 16 defines a flow chamber 20 having a flow inlet 22, through which the compressed gas enters the turbine starter 10, and a flow outlet 24. The turbine wheel 12 is disposed in the flow chamber 20 between the flow inlet 22 and the flow outlet 24 and includes a plurality of blades 26 disposed circumferentially around the turbine wheel 12. The turbine wheel 12 further includes a central axially-extending starter shaft 28. The turbine wheel 12 is mounted to the starter shaft 28 such that the starter shaft 28 is driven in rotation about its axis as the turbine wheel 12 is driven to rotate about its axis by the compressed gas passing through the plurality of blades 26 to the flow outlet 24. A turbine shield 30, having a plurality of stator vanes 32 disposed circumferentially thereabout, is disposed in the flow chamber 20 upstream of the turbine wheel 12 to direct the compressed gas from the flow inlet 22 toward the plurality of blades 26 in a desired manner. In some embodiments, a flow deflector 34 may be disposed in the flow chamber 20 downstream of the turbine wheel 12 to direct the compressed gas toward the flow outlet 24.

The energy extracted from the compressed gas via the turbine wheel 12 is transmitted via the starter shaft 28 into an output shaft 36 operably connected to an engine gearbox shaft 38 of an engine gearbox assembly 40. The engine gearbox assembly 40 is also referred to herein as a secondary component 40 with respect to the turbine starter 10. In the embodiment of FIG. 1, a starter lubricant 42, for example, oil, is delivered to elements of the turbine starter 10 via a splash system. Because the turbine starter 10 generates a substantial amount of heat in its operation, much of this heat is transferred to the starter lubricant 42 as it is flowed throughout the turbine starter 10. To extend its useful life, it is desired to periodically cool the starter lubricant 42. Because the environment of the engine gearbox assembly 40 is at a lower temperature than that of the turbine starter 10, the engine gearbox assembly 40, specifically engine gearbox coolant 44, is utilized as a heat sink to cool the starter lubricant 42.

Starter lubricant 42 pools in a lubricant sump 46 inside of the turbine starter 10 where the rotating elements, for example, a gear assembly 48, pick up an amount of starter lubricant 42 while passing through the lubricant sump 46. When the turbine starter 10 is not in operation, a clutch 66 decouples the turbine starter 10 from the engine gearbox assembly 40, so the gear assembly 48 does not continue to rotate. In this case, a splash guard 68 continues to rotate with the engine gearbox shaft 38 to distribute starter lubricant 42. One or more lubricant troughs 50 are disposed in the turbine starter 10, in some embodiments, near a top 52 of the turbine starter 10. As the starter lubricant 42 is circulated by the rotating elements, at least a portion of the starter lubricant 42 collects in the lubricant troughs 50. One or more outflow transfer passages 54 are located at the lubricant troughs 50 and extend from the turbine starter 10 into the engine gearbox assembly 40. At least one heat exchange pipe 56, also referred to as heat exchange passage 56, is connected to an engine gearbox end 58 of each transfer passage and passes through the engine gearbox assembly 40 and is connected to one or more return transfer passages 60 that extend from the engine gearbox assembly 40 back into the turbine starter 10. In some embodiments, the at least one heat exchange pipe 56 includes a plurality of fins 62 extending outwardly therefrom to promote heat transfer.

Starter lubricant 42 flows, in some embodiments, naturally via gravity, from the lubricant troughs 50 through the one or more outflow transfer passages 54 and into the at least one heat exchange pipe 56. As the starter lubricant 42 flows through the heat exchange pipe 56, heat from the starter lubricant 42 is transferred to the heat exchange pipe 56 and dissipated into the engine gearbox coolant 44 flowing around an exterior of the heat exchange pipe 56. Its temperature lowered via this heat exchange, the starter lubricant 42 flows through the one or more return transfer passages 60 into the turbine starter 10 and the lubricant sump 46.

Figure 2:
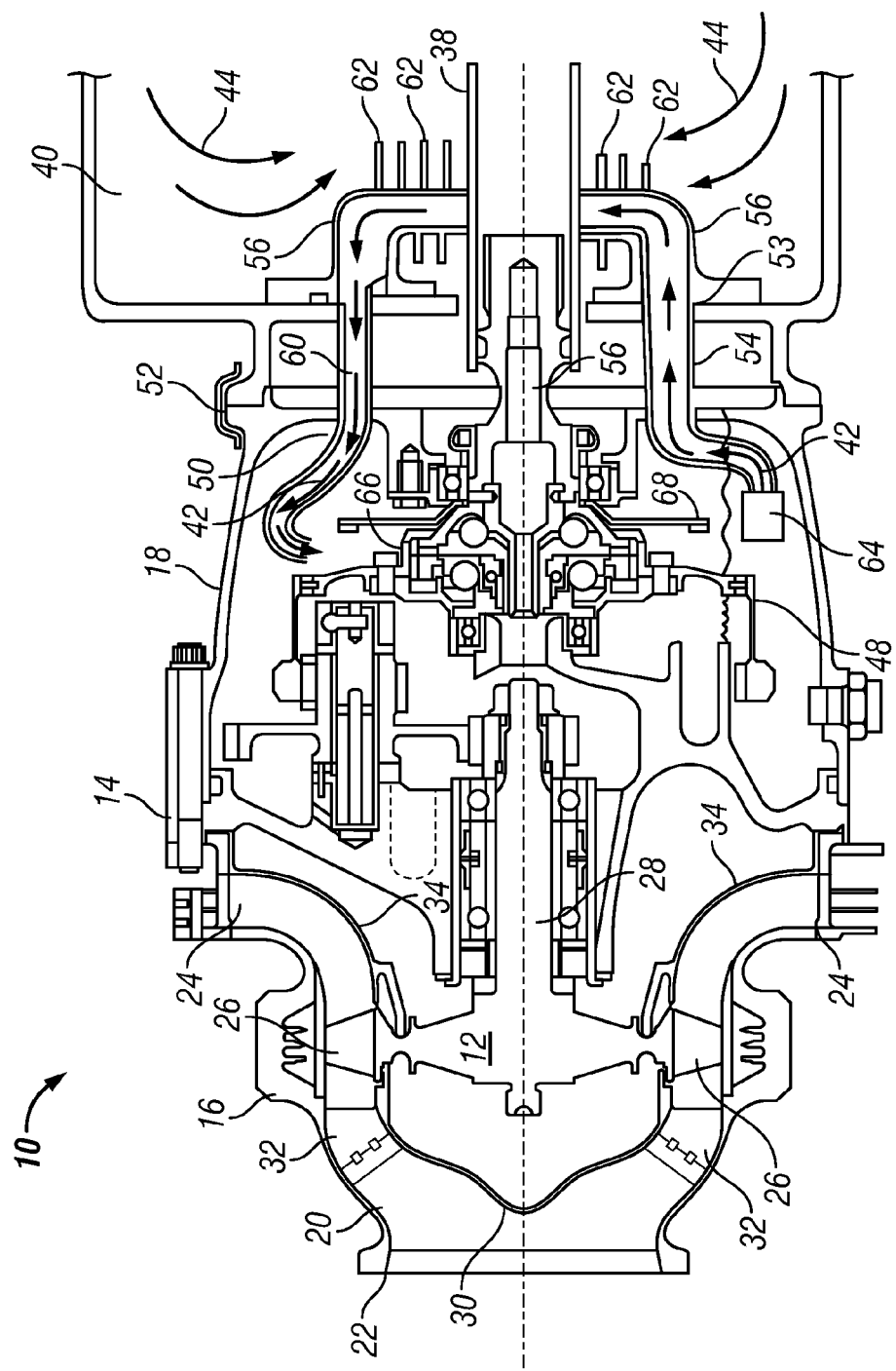
FIG. 2 is a cross-sectional view of another embodiment of a cooling system for a turbine starter.

Referring now to FIG. 2, some embodiments or turbine starters 10 utilize an internal pump 64 to circulate the starter lubricant 42 throughout the turbine starter 10, rather than a splash system as shown in FIG. 1. The internal pump 64 is utilized, for example, in turbine starters 10 where there is a desire to direct starter lubricant 42 to key elements, for example, bearings, gear assembly 48, and/or clutch 66. In this embodiment, heated starter lubricant 42 is pumped, via the internal pump 64, through the one or more outflow transfer passages 54 and into the at least one heat exchange pipe 56. As the starter lubricant 42 flows through the heat exchange pipe 56, heat from the starter lubricant 42 is transferred to the heat exchange pipe 56 and dissipated into the engine gearbox coolant 44 flowing around an exterior of the heat exchange pipe 56. Its temperature lowered via this heat exchange, the starter lubricant 42 flows through the one or more return transfer passages 60 into the turbine starter 10.

Routing the starter lubricant 42 through the at least one heat exchange pipe 56 and utilizing the cooler environment of the engine gearbox assembly 40 to cool the starter lubricant 42 passively cools the starter lubricant 42 without significant additional structure, for example, filters or fans which would have a negative impact on weight and/or packaging. Further, this cooling scheme utilizes the cooler environment of the engine gearbox assembly 40 without mingling the starter lubricant 42 and the engine gearbox coolant 44. While the embodiments described in detail herein utilize the lower temperature environment of the engine gearbox assembly 40 to cool the starter lubricant 42, utilization of other lower temperature environments may be utilized to cool the starter lubricant 42 is contemplated within the present scope.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooling system for turbine starter lubricant comprising:
    one or more outflow transfer passages extending from a compressed gas driven turbine starter to a gearbox assembly;
    at least one heat exchange passage extending through the gearbox assembly at least partially vertically, affixed at a first end to an end of an outflow transfer passage of the one or more outflow transfer passages, the gearbox assembly having a lower interior temperature than the turbine starter during operation;
    one or more return transfer passages affixed to a second end of the at least one heat exchange passage and extending from the gearbox assembly to the turbine starter, whereby flowing a volume of starter lubricant through the one or more outflow transfer passages, the at least one heat exchange passage, and the one or more return transfer passages removes thermal energy from the volume of starter lubricant and returns the volume of starter lubricant to the turbine starter, the one or more return transfer passages are disposed inside the turbine starter at a higher elevation than the one or more outflow transfer passages; and
    an internal pump disposed inside a turbine starter housing to circulate the volume of starter lubricant through the at least one heat exchange passage;
    wherein thermal energy is removed from the starter lubricant via transfer from the starter lubricant flowing through the at least one heat exchange passage to a gearbox coolant circulating in the gearbox assembly at an exterior of the at least one heat exchange passage.

2. The cooling system of claim 1 wherein the at least one heat exchange passage includes a plurality of fins extending therefrom to increase heat transfer.

3. The cooling system of claim 1 wherein flow of the volume of starter lubricant through the cooling system is driven by gravitation forces.

4. The cooling system of claim 1 including at least one lubricant trough disposed at the one or more outflow passages to collect the volume of starter lubricant for cooling.

5. The cooling system of claim 1 wherein the turbine starter utilizes splash lubricant circulation.

6. A method of cooling lubricant comprising:
    flowing a volume of starter lubricant from a compressed gas driven turbine starter to a gearbox assembly via one or more outlet transfer passages by operation of an internal pump disposed inside the turbine starter;
    flowing the volume of starter lubricant through at least one heat exchange passage extending through the gearbox assembly at least partially vertically, the gearbox assembly having a lower interior temperature than the turbine starter during operation, thereby removing thermal energy from the volume of starter lubricant via thermal energy transfer from the starter lubricant flowing through the at least one heat exchange passage to a gearbox coolant circulating in the gearbox assembly at an exterior of the at least one heat exchange passage; and returning the volume of starter lubricant to the turbine starter via one or more return transfer passages;

wherein the one or more return transfer passages are disposed inside the turbine starter at a higher elevation than the one or more outflow transfer passages.

7. The method of claim 6 including dissipating thermal energy from the volume of starter lubricant via a plurality of fins extending from the at least one heat exchange passage to increase heat transfer.

8. The method of claim 6 including impinging the gearbox coolant on the at least one heat exchange passage to remove thermal energy from the volume of starter lubricant.

9. The method of claim 6 including flowing the volume of starter lubricant through the cooling system via gravitational forces.

10. The method of claim 6 including collecting the volume of starter lubricant for cooling in at least one lubricant trough disposed at the one or more outflow transfer passages.

11. The method of claim 6 including circulating the volume of starter lubricant throughout the turbine starter via rotation of elements of the turbine starter.

\* \* \* \* \*